March 6, 1928.

J. F. O'CONNOR 1,661,335

ANTIFRICTION BEARING

Filed Jan. 18, 1924

Witnesses
Wm. Geiger

Inventor
John F. O'Connor
By George J. Haight
His Atty.

Patented Mar. 6, 1928.

1,661,335

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ANTIFRICTION BEARING.

Application filed January 18, 1924. Serial No. 686,945.

This invention relates to improvements in anti-friction bearings.

One object of this invention is to provide an anti-friction bearing especially adapted for railway cars and wherein the parts are so arranged that the anti-friction elements will return to normal position under the influence of gravity when free from load.

Another object of my invention is to provide an anti-friction bearing, especially adapted for railway side bearings, so designed that a plurality of anti-friction elements proper are employed, which are automatically returned to their normal position after being actuated, solely under the influence of gravity and without the aid of springs, counter weights or other expedients heretofore found necessary to the end that the anti-friction bearing is always in condition to operate for its full intended travel.

More specifically, an object of the invention is to provide an anti-friction bearing employing at least two rolling anti-friction elements, each of which is normally positioned at one extreme end of its path of movement, the elements being oppositely disposed so that one element will be available for operation regardless of the direction in which the side bearing is actuated and whereby said elements may be made automatically self-returning under the influence of gravity without the aid of springs or special counter weights. By arranging these elements out of alinement so that they may move past each other, as shown in the specific embodiment hereinafter described, I am enabled to obtain a shorter and more compact bearing than heretofore for a given travel where the anti-friction element is of the rolling type, as distinguished from a rotating type.

Other objects and advantages of the invention will be more clearly apparent from the description and claims hereinafter following.

Figure 1:
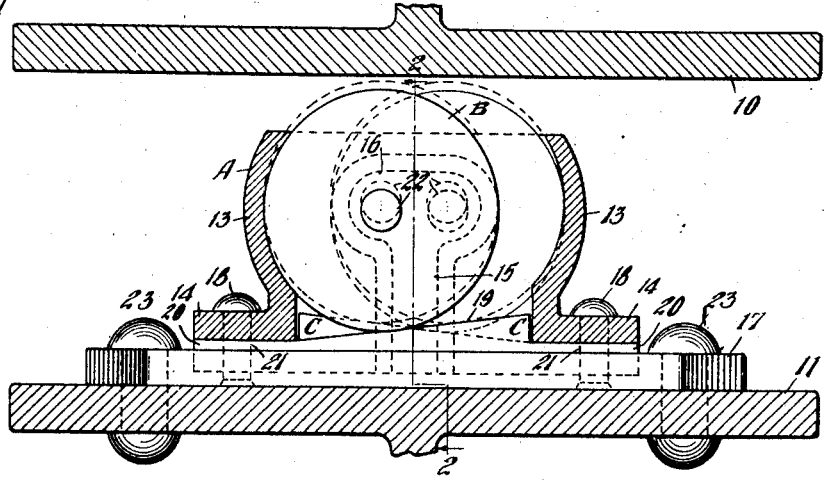
Figure 2:
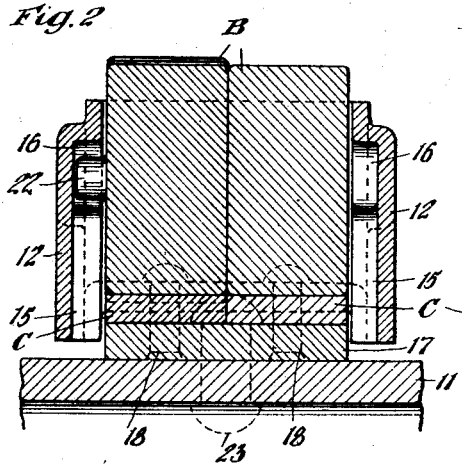
Figure 3:
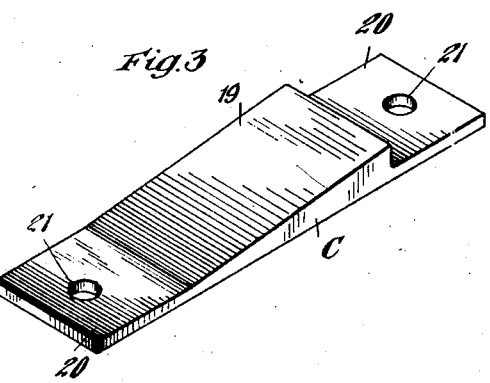

In the drawing forming a part of this specification, Figure 1 is a vertical sectional view taken through the ends of the body and truck bolsters of a car, showing my improvements in connection therewith. Figure 2 is a vertical sectional view taken substantially on the line 2—2 of Figure 1. And Figure 3 is a perspective view of one of the tapered bearing guides.

In said drawing, 10 denotes the under portion of a body bolster of a railway car and 11 the upper portion of a truck bolster opposed thereto.

Referring to the drawing, the improved side bearing is shown as applied to the truck bolster and comprises, broadly, a housing or retaining member A; a pair of anti-friction elements B; and a pair of bearing guides C.

The housing A is of more or less box-like form comprising side walls 12 and end walls 13, the latter having lateral projections 14 at their bottoms whereby they may be secured to the truck bolster, or, as shown in the drawing, for securement to a plate 17 by means of rivets 18, the plate 17 being in turn mounted upon the bolster by any suitable means, as by rivets 23. The top and bottom of the housing are open and the anti-friction elements B are arranged to roll past one another therein and project through said open top end. These elements, which are of like size and shape, are arranged side by side axially of one another, each having a trunnion 22 projecting outwardly therefrom. The side walls 12 of the housing have grooves 15 extending vertically upwardly from their open bottom ends, said grooves terminating in elongated grooves 16 extending lengthwise of the housing and adapted to receive the trunnions 22.

Interposed between the anti-friction elements B and the plates 17 are a pair of bearing guides C, each being substantially wedge shaped or tapered in vertical cross-section, the inclined bearing faces being indicated at 19, and having extensions 20 extending lengthwise and provided with apertures 21 to receive the rivets 18. The guides are arranged side by side in the bottom of the housing, the inclined surfaces extending in reverse directions therein and each adapted to support one of the anti-friction elements B thereon. The end walls 13 of the housing are curved so as to snugly receive the anti-friction elements thereagainst and form end stops therefor.

The operation of the bearing is as follows. Assuming the loaded bolster 10 is moved to the left relatively of the bolster 11, the anti-friction elements being in their normal position at the opposite ends of the housing and lying against the end walls, the bolster 10 will engage the tops of both the anti-friction elements, but as one of them is necessarily at its limit of movement in the direction in which the bolster 10 is moving, it will remain stationary, while the other element is free to move upwardly of its respective bearing guide and will take the load, rolling upwardly of its guide until it reaches the opposite end of the housing. As soon as the load is released, the roller which has been actuated or rolled will return under the influence of gravity to its normal position against the end of the housing. If the loaded bolster 10 is moved in the reverse direction to that just described, that element which formerly moved will remain fixed while the other element, which formerly remained stationary, will take the load and roll up its inclined surface past the stationary element.

Thus it is seen that the elements are normally retained at the opposite ends of the housing and when the body bolster moves in one direction under load, only one of the roller elements will take up the load to the end of its travel, the element taking the load being dependent upon the direction of movement of the loaded bolster.

As apparent from the preceding description, only one of the rolling elements B carries the load during the actual operation of the side bearing, but nevertheless, it will be apparent that, when the two bolsters approach each other suddenly as they do in actual service and thus cause what is known as "pounding", such pounding load will be taken by both of the anti-friction elements B simultaneously, thus distributing the load over a greater area. As hereinbefore described, the two elements B are made of like size and shape so that the possibility exists of the body bolster being in contact with both elements B simultaneously when the bolster starts to move in one direction. It is also possible that due to unavoidable variations arising in manufacture and from wear, one element B, as for instance the left hand element B may be engaged slightly in advance of the right hand element B, as viewed in Figure 1, when the body bolster comes down and starts to move toward the left. In either case, the bearing will function properly, due to the fact that it is mounted on the truck bolster, which, in turn, is resiliently supported by the bolster springs which permit the truck bolster to tilt sufficiently to allow the body bolster to engage the proper element B firmly, and obviously that one which can move in the proper direction will be the one operated as the body bolster shifts relatively to the truck bolster.

I have herein shown and described what I now consider the preferred manner of carrying out my invention but the same is merely illustrative and I contemplate all changes and modifications that come within the scope of the claims appended hereto.

I claim:

1. In an anti-friction bearing for railway cars, the combination with a housing adapted for attachment to a truck bolster, and having reversely inclined bearing surfaces at its bottom extending longitudinally of the housing, said bearing surfaces being arranged on opposite sides of the housing; of a pair of anti-friction rollers normally arranged at the lower ends of said inclined surfaces whereby only one of said rollers at a time will take the load to the end of travel and roll upwardly past the other, when the body bolster moves relatively thereto.

2. In a roller side bearing, the combination with a retaining member adapted to be mounted on a bolster and provided with a pair of oppositely inclined bearing surfaces arranged side by side and extending in substantially parallel relation lengthwise of the retaining member; of a pair of anti-friction elements arranged side by side in said member, each co-operating with one of said bearing surfaces and adapted for rolling thereon.

3. In an anti-friction roller side bearing, the combination with a retaining member; of a pair of adjacent, bottom bearing plates inclined upwardly in opposite directions, each plate extending from end to end of said retaining member; of a pair of anti-friction elements co-operating with the bearing plates and arranged to roll past one another and each supported on one of said inclined bearing plates.

4. In an anti-friction bearing for railway cars, the combination with a retaining member adapted to be mounted on a bolster; of a pair of wedge-shaped bearing plates adapted to be arranged side by side in the bottom of said member and so that they are inclined in opposite directions; and a pair of anti-friction rollers, one resting on each bearing plate, only one engageable in each direction of movement of the co-operating bolster under load to roll up its inclined plate, and return to normal position when free from load.

5. In a roller side bearing, the combination with a housing adapted to be mounted on a truck bolster and having a pair of reversely inclined bearing surfaces arranged adjacent one another at the bottom thereof; of a pair of anti-friction elements arranged side by side in said housing, normally resting on the bearing surfaces at opposite ends of the housing, whereby when the body bolster under load is moved in one direction, it will engage one of said elements to roll it up its inclined bearing surface transmitting the load therethrough and permit it to return to its normal position by gravity when free from load, said body bolster engaging the other element to roll it in the opposite direction on its inclined bearing surface when the bolster is moving under load in the opposite direction.

6. In an anti-friction bearing, the combination with relatively movable members; of a support on one of said members; a plurality of anti-friction elements interposed between said members; abutment means at opposite ends of said bearing engaged by each roller to limit the movement thereof in opposite directions; and means for elevating one of said rollers as it approaches one end of said support upon relative movement of said members to cause independent engagement thereof with one or another of said anti-friction elements, depending upon the direction of movement of said members.

7. In an anti-friction bearing, the combination with relatively movable members; of a plurality of anti-friction elements interposed between said members; and means operative to cause engagement of said members with one or another of said anti-friction elements, dependent upon the direction of movement of said members, said means being arranged to permit said anti-friction elements to pass each other during their operative movement.

8. In an anti-friction bearing, the combination with relatively movable members, said members being relatively movable in substantially parallel planes in two different directions; of a plurality of relatively movable anti-friction elements interposed between said members; means on one of said members for displacing said relatively movable elements with reference to each other toward the other of said members upon relative movement of said members in either direction to effect separate and independent operation of said anti-friction elements, depending upon the direction of movement of said members, said means serving to automatically return said anti-friction elements to a predetermined position after operation.

In witness that I claim the foregoing I have hereunto subscribed my name this 14th day of January, 1924.

JOHN F. O'CONNOR.